(12) United States Patent
Vastmans

(10) Patent No.: US 9,256,042 B2
(45) Date of Patent: Feb. 9, 2016

(54) HOLDING FIXTURE FOR HOLDING AT LEAST ONE CABLE WITH AN AFFIXING MEMBER AND A CLAMPING MEMBER

(75) Inventor: Kristof Vastmans, Boutersem (BE)

(73) Assignee: Tyco Electronics Raychem BVBA, Kessel-Lo (BE)

( * ) Notice: Subject to any disclaimer, the term of this patent is extended or adjusted under 35 U.S.C. 154(b) by 145 days.

(21) Appl. No.: 14/344,991

(22) PCT Filed: Sep. 11, 2012

(86) PCT No.: PCT/EP2012/067692
§ 371 (c)(1),
(2), (4) Date: Mar. 14, 2014

(87) PCT Pub. No.: WO2013/037746
PCT Pub. Date: Mar. 21, 2013

(65) Prior Publication Data
US 2014/0348482 A1    Nov. 27, 2014

(30) Foreign Application Priority Data
Sep. 16, 2011   (EP) .................................... 11181625

(51) Int. Cl.
*G02B 6/00*   (2006.01)
*G02B 6/44*   (2006.01)
(52) U.S. Cl.
CPC ............ *G02B 6/4471* (2013.01); *G02B 6/4477* (2013.01); *G02B 6/4494* (2013.01)
(58) Field of Classification Search
CPC ............................. G02B 6/4471; G02B 6/4477
USPC ................................................. 385/136–137
See application file for complete search history.

(56) References Cited

U.S. PATENT DOCUMENTS

| 6,625,849 B1* | 9/2003 | Womack ............... G02B 6/3616 24/115 M |
| 6,963,690 B1* | 11/2005 | Kassal ................. G02B 6/3817 385/137 |
| 8,452,150 B2* | 5/2013 | Winberg ................ G02B 6/245 385/136 |
| 9,042,698 B2* | 5/2015 | Klimowych ............. G02B 6/25 385/134 |
| 2003/0063890 A1* | 4/2003 | Wu ....................... G02B 6/4471 385/137 |
| 2006/0067637 A1 | 3/2006 | Carpenter et al. |

(Continued)

FOREIGN PATENT DOCUMENTS

| EP | 2 330 706 | 6/2011 |
| WO | WO 2008/118927 | 10/2008 |
| WO | WO 2010/102657 | 9/2010 |

OTHER PUBLICATIONS

International Search Report from International Application No. PCT/EP2012/067692 mailed Nov. 12, 2012 (3 pages).

*Primary Examiner* — Sung Pak
(74) *Attorney, Agent, or Firm* — Merchant & Gould P.C.

(57) ABSTRACT

The invention relates to a holding fixture (71) for holding at least one cable (72) with an affixing member (1) and a clamping member (40). In order to ensure that the clamping member (40) and the affixing member (1) are arranged in a holding position (H), in which the cable (72) is securely held, the invention provides that the holding fixture (71) is provided with an indicator element (77, 78) that is at least sectionwise laterally shielded by the clamping member (40), if the clamping member (40) is arranged before its holding position (H), and that is arranged in an indication position (I), in which it can easily be perceived, if the clamping member (40) is arranged in its holding position (H).

15 Claims, 5 Drawing Sheets

(56) References Cited

U.S. PATENT DOCUMENTS

| | | |
|---|---|---|
| 2010/0059246 A1 | 3/2010 | Wakileh et al. |
| 2011/0268417 A1* | 11/2011 | Quesnel ............... F16G 11/04 385/137 |
| 2012/0002935 A1 | 1/2012 | Hartmann |

* cited by examiner

HOLDING FIXTURE FOR HOLDING AT LEAST ONE CABLE WITH AN AFFIXING MEMBER AND A CLAMPING MEMBER

This application is a National Stage Application of PCT/EP2012/067692, filed 11 Sep. 2012, which claims benefit of Ser. No. 11/181,625.2, filed 16 Sep. 2011 in Europe and which applications are incorporated herein by reference. To the extent appropriate, a claim of priority is made to each of the above disclosed applications.

BACKGROUND

The invention relates to a holding fixture for holding at least one tube for guiding a cable and/or at least one cable, in particular fibre optic cable, along a longitudinal direction of the tube or cable, the holding fixture comprising an affixing member for holding the tube or cable, the affixing member being shaped with two laterally opposing side supports, which define between them a holding channel for at least sectionwise receiving the tube or cable, the holding channel extending in the longitudinal direction, and a clamping member, the clamping member being adapted to be mounted on the affixing member and, in a mounted state, to be moved from a pre-holding to a holding position.

Holding fixtures for holding cables are known in the art. For instance, EP 2 330 706 A1 discloses holding fixtures for cables, which are part of a gel sealing device for sealing a passage through an opening, e.g. in a wall of a house, with which cables can be guided and held. For securing the cables against movements at least parallel and maybe even perpendicular to a longitudinal direction of the cable, the known holding fixture comprises a fastener clip for holding the cable, which can be affixed to a cable guidance member of the holding fixture.

With the known holding fixtures, it is, however, not easily recognisable if the fastening clip is correctly mounted. If the fastening clip is not correctly mounted, the cable may not be affixed and may thus be moved, even if only low mechanical forces act upon the cable. A movement of the cable, however, may influence the sealing properties of the gel sealing device and affect a function of a device, to which the cable is connected.

In view of these disadvantages of the known holding fixtures, an object underlying the invention is to provide holding fixtures that prevent incorrect assembly of holding fixtures.

SUMMARY

The object is achieved according to the invention for the holding fixture mentioned in the beginning in that the affixing member comprises at least one indicator element, which, in the pre-holding position, is at least sectionwise laterally shielded by the clamping member and, in the holding position, is arranged in an indication position for indicating that the clamping member is arranged in the holding position.

These simple solutions provide that a person assembling the holding fixture can easily check if the clamping member is safely arranged in its holding position by simply looking at the at least one indicator element. In order to be able to recognise the holding position, the indicator element may in its indication position be arranged visibly from a lateral viewpoint and may even protrude from the clamping member. Hence, the indicator element protruding from the clamping member may also be checked automatically, e.g. by an optical, magnetical or by other automated control equipment. In the holding position of the clamping member, the indicator element is in particular more easily perceived compared to the pre-holding position.

The solutions according to the invention can be combined as desired and further improved by the further following embodiments that are advantageous on their own, in each case.

According to a first possible embodiment, the indicator element may at least sectionwise have a colour that differs from the colour of the clamping member at least in the area of the indicator element, when the clamping member is arranged in the holding position. In particular, the indicator element may be of a colour that contrasts with the colour of the clamping member. For instance, the clamping member may have the colour bright red orange (RAL 2008) and the indicator element may have the colour umbra grey (RAL 7022). Contrasting colours further facilitate that the indicator element and the clamping member are easily distinguishable from one another and that the holding position of the clamping member is easily detectable.

In some cases it may occur that it appears that the indicator element is arranged in the indication position, with the clamping member not being in the holding position. In particular, if the clamping member is almost in the holding position, the indicator element may only be apparently in the indication position. In order to be able to clearly distinguish between a holding position of the clamping member and a position between the holding position and the pre-holding position, the holding fixture may be provided with a return spring device, which, in the position of the clamping member between the pre-holding and the holding position, exerts a bias force onto the clamping member directed away from the almost holding position towards the pre-holding position such that the clamping member is urged towards the pre-holding position and the indicator element does not remain in the apparent indication position without the clamping member having reached the holding position.

The return spring device can be provided with at least one bevelled returning surface, which points away from the holding channel. When moving the clamping member from the pre-holding to the holding position, the return spring device may be elastically deflected by the clamping member towards the holding channel. The bevelled return surface then transforms the bias force that may essentially be directed perpendicular to the holding channel to a force that is directed towards the pre-holding position and that acts onto the clamping member.

The return spring device may be part of at least one latching device for securing the clamping member in the holding position. The at least one latching device may be formed as a part of the affixing member and may be shaped with a latching element, which interacts with the clamping member at least in the holding position. It is preferable that the return spring device is a part of the at least one latching device. A combination of the return spring device and the latching device, in which the bevelled returning surface of the return spring device is formed by a bevelled surface of a latch hook of the at least one latching device, results in an embodiment having a highly integrated design with a reduced number of components.

Independent of the integration of the return spring device and the latching device, the return spring device may be provided with the indicator element, again resulting in a more compact design. To be able to shape the holding fixture such that the indicator element can easily be recognised, it is preferable that the indicator element is provided on a free end of the return spring device, the free end pointing perpendicular to the holding channel. The direction-indication perpendicular to the holding channel means parallel to a direction of movement of the clamping member from the pre-holding to the holding position.

Additionally or alternatively, the latching device may be provided with the indicator element, which may protrude from the latching device perpendicular to the holding channel.

In a further advantageous embodiment, the holding fixture may be provided with a retaining device that is adapted to retain a strain-relief tape of the cable. As the cable may enter the holding channel with its sheath and as the sheath may be removed from the cable when leaving the holding channel, e.g. if a conductor of the cable shall be connected to a device, it may be advantageous if the strain-relief tape is affixed to the holding fixture. Thereby, the position of the cable in the holding fixture may be further secured.

Again, the retaining device may be provided with the indicator element for a higher integration. In another possible embodiment, also the return spring device and/or the latching device may be combined and integrated with the retaining device. In another possible embodiment, the retaining device and the latching device may be separate devices, which are specially adapted to their functions.

The retaining device is preferably shaped with a retaining recess that extends in the longitudinal direction, hence parallel to the holding channel, and is confined perpendicular to the holding channel by a retaining projection of the retaining device, the retaining projection extending parallel to the longitudinal direction. The retaining recess may be adapted such that the strain-relief tape can be inserted into the recess parallel to the longitudinal direction. In particular, the strain-relief tape can be wound around the retaining device, thereby being held in the retaining recess.

The clamping member preferably has an essentially U-shaped cross-section with a clamping channel defined between opposing clamping legs. The clamping channel may be adapted such that the clamping member can be imposed on the affixing member when moving the clamping member into its holding position.

A clear width between the clamping legs preferably increases at least sectionwise towards free ends of the clamping legs. When moving the clamping member into the holding position, the affixing member faces a decreasing clear width and the side supports may be gradually pressed towards the holding channel when further moving the clamping member into the holding position.

In order to ensure that the side supports are pressed towards the holding channel when the clamping member is moved into the holding position, the minimum clear width defined between the clamping legs may be smaller than a distance between pressing surfaces of the side supports. The pressing surfaces are the surfaces of the side supports that point away from the holding channel, i.e. away from each other.

The side supports may be formed with holding surfaces that face the holding channel and against which the cable may rest at least in the holding position of the clamping member. In order to increase a holding strength of the holding fixture acting on the cable, at least one area of at least one of the holding surfaces of the side supports may be formed with a gripping structure. The gripping structure may for instance be provided with saw teeth. In order to ensure that the cable cannot easily be removed out of the holding channel against the longitudinal direction, a front of the saw teeth may point in the longitudinal direction. If also movements in the longitudinal direction shall be prevented, at least one saw tooth can be shaped with a front that points against the longitudinal direction.

In order to be able to easily assemble the holding fixture, the clamping member and the affixing member can be joined in a hinge-like manner. Due to this hinge-connection, the clamping member can be swivelled at least from the pre-holding to the holding position, simplifying the operation of the holding fixture. The hinge is preferably formed by at least one bearing pin and by at least one bearing recess, the bearing recess being adapted for accommodation of the bearing pin at least in the holding position. The bearing pin may be formed on the affixing member or on the clamping member and the bearing recess may be formed in the respective other member.

When closing the holding fixture by moving the clamping member into its holding position, the clamping and the affixing member may cant. In order to avoid such a malfunction of the holding fixture, the affixing and/or the clamping member may comprise at least one guiding element. Preferably, both the affixing member and the clamping member each comprise at least one guiding element for cooperatively guiding the movement of the clamping member into its holding position.

In some case, it may occur that cables with a diameter that is considerably smaller than a clear width of the holding channel shall be held with the holding fixture. Such a cable, however, may not be held, if the clear width of the holding channel remains larger than the diameter of the cable in the holding position of the clamping member. In order to enhance the flexibility of application of the holding fixture, the holding fixture preferably comprises an adapter rod that is adapted to be introduced into the holding channel, thereby reducing the clear width of the holding channel.

The adapter rod may comprise a holding surface that is preferably provided with a gripping structure, e.g. with the same gripping structure as the holding surface of the side supports. Furthermore, the adapter rod may be shaped with holding cheeks for limiting movements of the cable perpendicular to the longitudinal direction and in particular out of the holding channel.

When introduced into the holding channel, a movement of the adapter rod may be limited in and/or against the longitudinal direction. Therefore, the adapter rod may be provided with a mounting device, e.g. with a mounting hook or claw. The mounting hook or claw can be placed over one of the side supports, such that the adapter rod cannot be moved further in or against the longitudinal direction.

If more than one cable shall be held, it is preferable that the holding fixture is part of a kit, the kit comprising at least one mounting member for connecting the holding fixture to at least one other holding fixture.

For providing the advantageous holding functionality according to the invention to the gel sealing device known in the art, the holding fixture may replace one of the known cable guidance members and may thus be part of the gel sealing device for sealingly guiding and holding the cable.

The features of the holding fixture described above are advantageous on their own, in particular without the indicator element, as holding of the at least one cable is improved by the design of the affixing member and the clamping member, as disclosed in the following description of the drawings, too.

BRIEF DESCRIPTION OF THE DRAWINGS

The invention will be described hereinafter in greater detail and in an exemplary manner using advantageous embodiments and with reference to the drawings. The described embodiments are only possible configurations in which, however, the individual features as described above can be provided independently of one another and can be omitted in the drawings.

DETAILED DESCRIPTION

Figure 1:
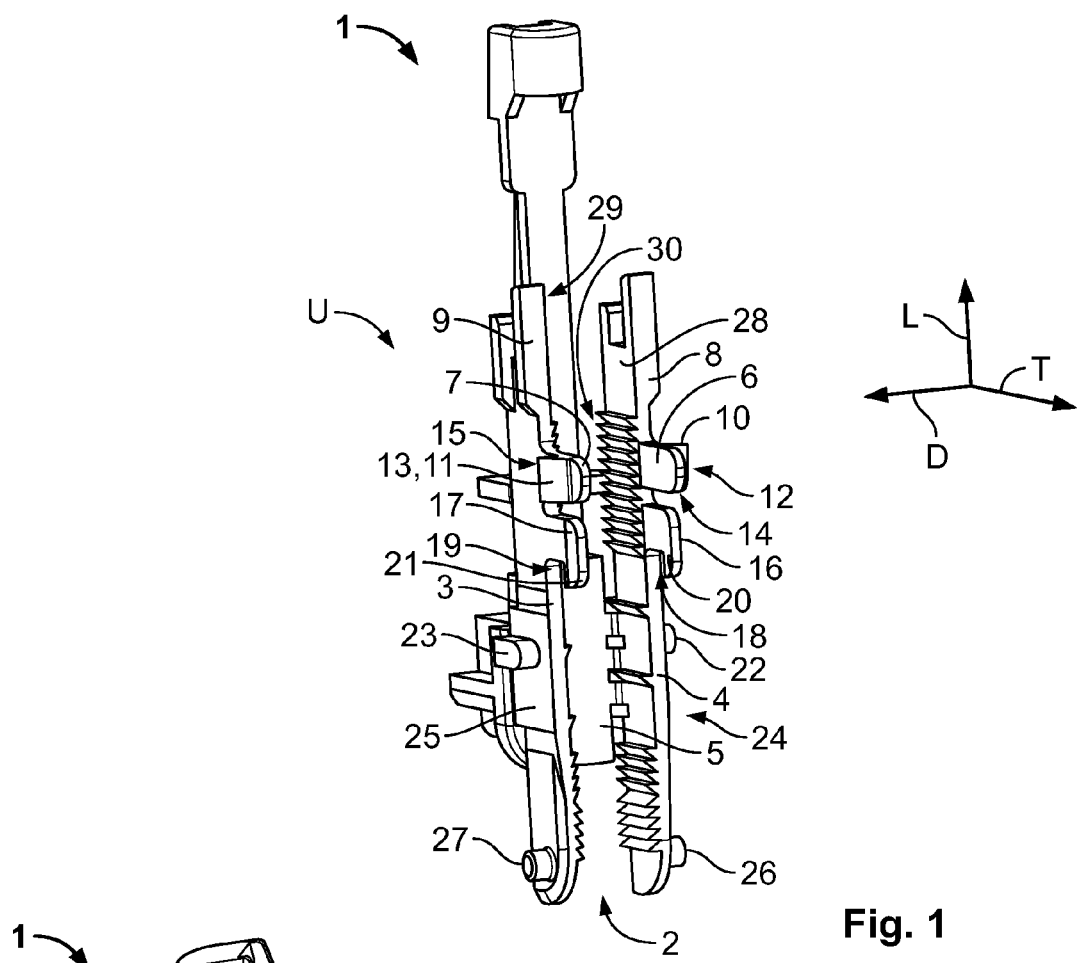
FIG. 1 is a schematic perspective view of an exemplary embodiment of an affixing member of a holding fixture according to the invention.

First, an affixing member 1 is described with reference to FIG. 1. For at least sectionwise receiving and holding a cable, the affixing member 1 is preferably formed with a holding channel 2, which extends along a longitudinal direction L. The holding channel 2 may be defined between two side supports 3, 4 of the affixing member 1, which may be arranged opposite to each other. The side supports 3, 4 can extend in the longitudinal direction L, thereby flanking the holding channel 2. The side supports 3, 4 are preferably arranged at a distance to each other in a width direction D, the width direction D extending perpendicular to the longitudinal direction L for defining the holding channel 2. Furthermore, the holding channel 2 may be defined by a ground 5, such that the affixing member 1 may at least sectionwise have a U-shape in the area of the holding channel 2 perpendicular to the longitudinal direction L. Away from the ground 5, the holding channel 2 may comprise an opening for insertion of the cable against a transverse direction T extending perpendicular to the longitudinal direction L and to the width direction D.

The affixing member 1 can comprise at least one and in particular two latching devices 6, 7 for securing a clamping member in a holding position. The latching devices 6, 7 may extend in the transverse direction T and can protrude from free ends 8, 9 of the side supports 3, 4. The latching devices 6, 7 can be formed as latching tongues, each of which being formed with at least one latching element 10, 11. The latching elements 10, 11 may be arranged on sides of the latching devices 6, 7 that point away from the respective other latching device 6, 7, i.e. away from the holding channel 2. For instance, the latching elements 10, 11 may be latching hooks with bevelled surfaces 12, 13, which have surface normals with components that point in the transverse direction T and in or against the width direction D.

Against the transverse direction T, the latching devices 6, 7 may be formed with holding surfaces 14, 15, at which the latching hooks may end and which at least component-wise face against the transverse direction T. The latching devices 6, 7 may be elastically deflectable at least in and against the width direction D and in particular towards each other. In the embodiment of FIG. 1, the latching devices 6, 7 are shown in their undeflected positions U.

The affixing member 1 can furthermore comprise at least one and in particular two retaining devices 16, 17 that are adapted to retain a strain-relief tape of the cable. For instance, the retaining devices 16, 17 may be adapted such that the strain relief tape can be wound about at least one of the retaining devices 16, 17.

The retaining devices 16, 17 can be arranged on the free ends 8, 9 of the side supports 3, 4 and before or after the latching elements 10, 11. In the embodiment of FIG. 1, the retaining devices 16, 17 are arranged before the latching devices 6, 7 in the longitudinal direction L. Alternatively, the retaining devices 16, 17 and the latching devices 6, 7 may be merged to each other. The retaining devices 16, 17 can each define a retaining recess 18, 19, into which the strain-relief tape can at least sectionwise be introduced. The retaining recess 18, 19 may each be defined by one of the free ends 8, 9 of the side supports 3, 4 and by a retaining projection 20, 21. The retaining projections 20, 21 can extend in or against the longitudinal direction L. In the embodiment of FIG. 1, the retaining projections 20, 21 extend away from the latching devices 6, 7, such that the retaining recesses 18, 19 open against the longitudinal direction L.

Moreover, the affixing member 1 preferably comprises at least one and in particular two guiding elements 22, 23 for guiding a movement of the clamping member. The guiding elements 22, 23 can essentially extend in the transverse direction T and may protrude from outer surfaces 24, 25 of the side supports 3, 4, the outer surfaces 24, 25 pointing away from the holding channel 2, i.e. away from each other. The guiding elements 22, 23 can be arranged at a distance to the retaining devices 16, 17 and in particular before the retaining devices 16, 17 in the longitudinal direction.

Furthermore, the affixing member 1 can be shaped with at least one and in particular two hinge members 26, 27 for mounting the clamping member to the affixing member 1 in a hinge-like manner. For instance, the hinge members 26, 27 may be formed as bearing pins, each of which being arranged on one of the outer surfaces 24, 25 and protruding from the outer surfaces 24, 25 in or against the width direction D, i.e. away from the holding channel 2. The hinge members 26, 27 may be arranged before the retaining devices 16, 17 and/or the guiding elements 22, 23 in the longitudinal direction L.

Moreover, the affixing member 1 can be formed with at least one and particular with two holding surfaces 28, 29 for holding and affixing the cable. The holding surfaces 28, 29 may each be formed with a gripping structure 30 for engaging the cable in a form-fit manner. The gripping structure 30 may comprise one or more saw tooth elements, the back of at least selected saw tooth elements pointing in or against the longitudinal direction L.

At least one and in particular both of the side supports 3, 4 may be provided with one of the holding surfaces 28, 29, such that the gripping structure 30 faces the holding channel 2 from opposite sides.

Figure 2:
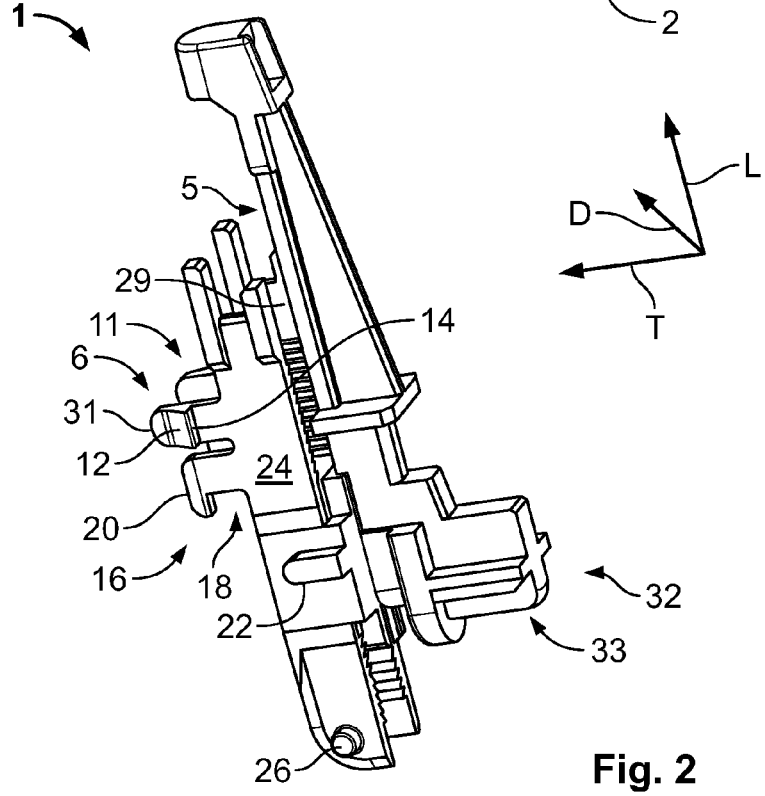
FIG. 2 is another schematic perspective view of the affixing member according to the exemplary embodiment of FIG. 1.

FIG. 2 shows the exemplary embodiment of FIG. 1 in another schematic perspective view.

In FIG. 2, the affixing member 1 is shown in a perspective side view, in which the transverse direction T essentially extends parallel to and the width direction D points into the plane of projection.

As can be seen in the view of FIG. 2, guiding element 22 as well as guiding element 23 comprise a cylindrical shape and a footprint that is essentially rectangular with a chamfered side, which points in the transverse direction T, i.e. into the same direction as the open end of the holding channel 2.

Furthermore, it can be seen in FIG. 2 that at least latching device 6 but also latching device 7 can be shaped with an actuating end 31 for manually moving the latching devices 6, 7 out of their undeflected positions P, the actuating ends 31 being formed as free ends of the latching devices 6, 7.

The affixing member 1 may comprise a mounting base 32, which extends from the ground 5 against the transverse direction T. The mounting base 32 can be adapted for mounting the affixing member 1 to a mounting member or holding fixture carrier, to which e.g. more than one holding fixture can be mounted. Furthermore, the mounting base 32 may be adapted for mounting the holding fixture in a gel sealing device for sealingly guiding the cable through an opening, for instance an opening in a wall of a house, which shall be supplied with the cable.

The mounting base 32 can be provided with an affixing element 33, which extends against the transverse direction T and which can be adapted to be affixed to the mounting member or to a holder of the gel sealing device. For instance, the affixing element 33 can be adapted to connect the holding fixture to the mounting member or the holder of the gel sealing device in a twist secured manner. In particular, the affixing element 33 may be formed with a cross-shaped cross-section, the legs of the cross extending parallel to the transverse direction T and the width direction D or into the transverse direction T and the longitudinal direction L.

Figure 3:
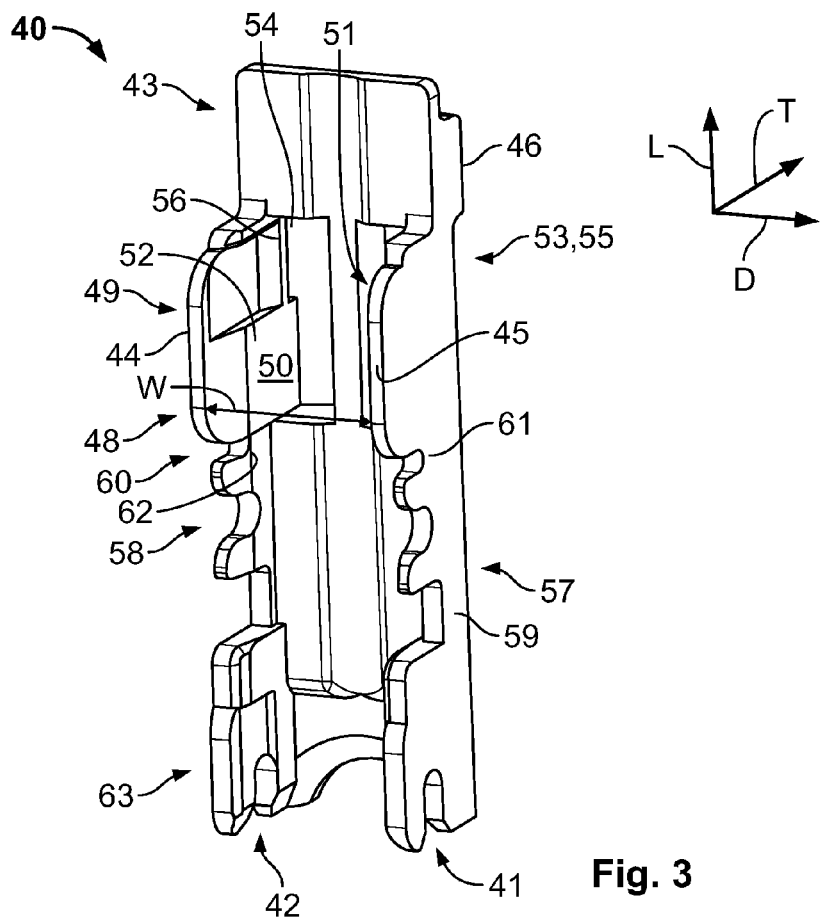
FIG. 3 shows an exemplary embodiment of a clamping member of the holding fixture according to the invention in a schematic perspective view.

FIG. 3 shows an embodiment of a clamping member 40 of the holding fixture in a schematic perspective view.

The clamping member 40 can be adapted to be mounted on the affixing member and in particular to be joined with the affixing member 1 in a hinge-like manner. For instance, the clamping member 40 can comprise at least one and in particular two hinge members 41, 42, of which each may be formed as a bearing recess, which extends parallel and opens against the longitudinal direction L. The bearing recesses of the clamping member 40 and the bearing pins of the affixing member 1 may be adapted to interact such that the bearing pins can be introduced into the bearing recesses in the longitudinal direction L, thereby forming a hinge, which allows the affixing member 1 to be swivelled around the width direction D, i.e. around the bearing pins. When swivelling, an operating end 43 of the clamping member 40, which is arranged opposite to the hinge members 41, 42, can be moved towards and away from the affixing member 1.

Perpendicular to the longitudinal direction L, the clamping member 40 preferably comprises an essentially U-shaped cross-section. The clamping member 40 can be shaped with at least one and in particular with two clamping legs 44, 45, which extend from a front 46 of the clamping member 40 against the transverse direction T. The clamping legs 44, 45 and the front 46 may at least sectionwise define a clamping channel 47, which extends parallel to the longitudinal direction L and opens against the transverse direction T. The clamping legs 44, 45 can hence be arranged opposite of each other, i.e. one after the other in the width direction D.

The clamping legs 44, 45 can each be formed with a clamping section 48 and with a latching section 49. A clear width W between the clamping sections 48 of opposing clamping legs 44, 45, which is to be measured parallel to the width direction D, can at least sectionwise decrease towards free ends of the clamping legs 44, 45, the free ends of the clamping legs 44, 45 pointing against the direction T. Thus, from the free ends of the clamping sections 48 towards the front 46, the clear width W may decrease, in particular starting with a maximum clear width W between the free ends of the clamping legs 44, 45, which decreases in the transverse direction T and passes into a holding section 50 of the clamping channel 47, which can have a constant clear width. The holding section 50 of the clamping channel 47 may be defined by holding faces 51, 52 of the clamping legs 44, 45, which are essentially aligned parallel to the longitudinal direction L and the transverse direction T.

The latching sections 49 may each be shaped with a latching element 53, 54, that is adapted to lock with the latching devices 6, 7 of the affixing member 1. For instance, the latching elements 53, 54 may be shaped as protrusions or setbacks extending parallel to the width direction D. At least one or each of the latching elements 53, 54 may be provided with a deflection element 55, 56, which is adapted to deflect one of the latching devices 6, 7 in or against the width direction D, i.e. towards the holding channel 2 or the respective other latching device 6, 7. The clear width W between the latching elements 53, 54 may correspond to a distance of the outer surfaces 24, 25 of the side supports 3, 4 of the affixing member 1 to each other or to outer surfaces of the actuating ends 31 of the latching elements 10, 11. Hence, when swivelling the clamping member 40 towards the affixing member 1, the latching elements 10, 11 will be deflected out of their undeflected positions U at least if the deflection elements 55, 56 are in contact with the bevelled surfaces 12, 13 of the latching devices 6, 7.

If the clear width W before the deflection elements 55, 56 in the transverse direction T is larger than the clear width W between the latching elements 53, 54, the clamping member 40 may be pressed away from the affixing member 1, if the latching devices 6, 7 are deflected towards each other and the bevelled surfaces 12, 13 of the latching devices 6, 7 rest against the deflection elements 55, 56. In the embodiment of FIG. 3, the deflection elements 55, 56 are formed as deflection edges, which extend parallel to the longitudinal direction L. The deflection edges may, however, be rounded or formed as bevelled surfaces, which may in particular be arranged parallel to the corresponding bevelled surface 12, 13.

Hence, the minimum clear width W between the clamping legs 44, 45 in particular in the area of the holding section 50 of the clamping channel 47 may be smaller than a distance between the outer surfaces 24, 25 of the side supports 3, 4 of the affixing member 1. Thus, the side supports 3, 4 may at least sectionwise be pressed towards each other by the clamping member 40. Therefore, the outer surfaces 24, 25 may also be designated as pressing surfaces 24, 25.

The clamping member 40 may be provided with at least one and in particular two guiding elements 57, 58, which in cooperation with the at least one or with the two guiding elements 22, 23 guide a movement of the clamping member 40 towards the affixing member 1 into the holding position of the clamping member 40. In the holding position, the clamping member 40 presses the side supports 3, 4 towards each other and is secured against movements out of the holding position by at least one of the latching devices 6, 7 and at least one of the latching elements 53, 54. At least one of the guiding elements 57, 58 may be formed complementary to one of the guiding elements 22, 23. Thus, the guiding elements 57, 58 of the clamping member 40 may, according to the embodiment of FIG. 3, be shaped as guiding recesses.

The guiding elements 57, 58 may be arranged at a distance to the clamping legs 44, 45 in the longitudinal direction L and may in particular be arranged before the clamping legs 44, 45 in the longitudinal direction L. In particular, the clamping legs 44, 45 and the guiding elements 57, 58 may be provided on side walls 59, 60 of the clamping member 40, which flank the clamping channel 47, are based on the front 46 and extend in the longitudinal direction L and against the transverse direction T.

The clamping legs 44, 45 and the guiding elements 57, 58 may be separated from each other in the longitudinal direction L by separation recesses 61, 62 in the side walls 59, 60, the separation recesses 61, 62 decoupling the clamping legs 44, 45 from the guiding elements 57, 59 mechanically.

The hinge members 41, 42 may also be provided on the side walls 59, 60. The guiding elements 57, 58 may be arranged on the sidewalls 59, 60 between the hinge members 41, 42 and the clamping legs 44, 45. The hinge members 41, 42 may be provided on a hinge end 63 of the clamping member 40, the hinge end being arranged opposite to the operating end 43 of the clamping section 48.

Figure 4:
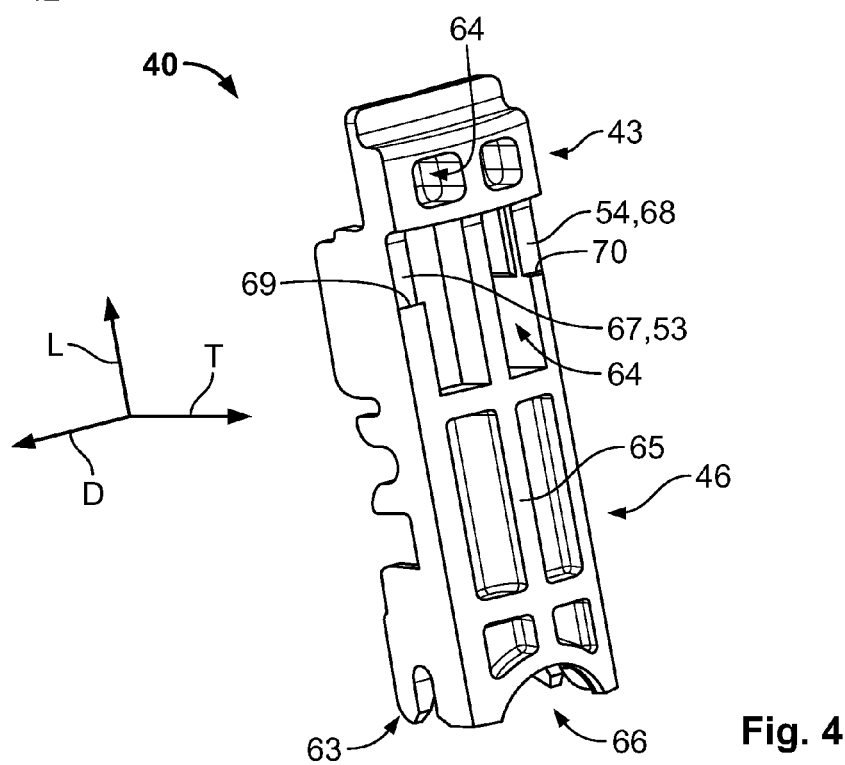
FIG. 4 shows the embodiment of the clamping member of FIG. 3 in another schematic perspective view.

FIG. 4 shows the clamping member 40 in another schematic perspective view.

In FIG. 4, the transverse direction T essentially extends out of the plane of projection and the width direction D is directed essentially parallel to the plane of projection.

As can be seen in FIG. 4, front 46 may be provided with at least one or even several cut-outs 64, which, together with the separation recesses 61, 62, may reduce weight by reducing use of material of the clamping member 40. In the embodiment of FIG. 4, the clamping member 40 comprises 8 cut-outs 64 in the front 46. The cut-outs 64 may be separated from each other by material bridges 65, the material bridges 65 enhancing mechanical stability of the clamping member 40. According to the embodiment of FIG. 4, the material bridges 65 are provided in a cross-arrangement.

Opposite to the operating end 43 of the clamping member 40 and in the area of the hinge end 63, the front 46 can comprise a cable indentation 66, which opens against the longitudinal direction L. The cable indentation 66 can be shaped in order to at least sectionwise receive the cable, if the clamping member 40 and in particular its operating end 43 is swivelled away from the affixing member 1. By way of providing the cable indentation 66, a maximum opening angle of the clamping member 40 with respect to the affixing member 1 can be increased. For instance, the cable indentation 66 can have an arc-like shape, in particular a circular arc-shape.

The latching elements 53, 54 can each be arranged in a setback 67, 68 in the front 46, the setbacks 67, 68 being arranged between steps 69, 70 and the operating end 43 in the longitudinal direction L, the operating end 43 at least sectionwise protruding from the setbacks 67, 68 in the transverse direction T.

Figure 5:
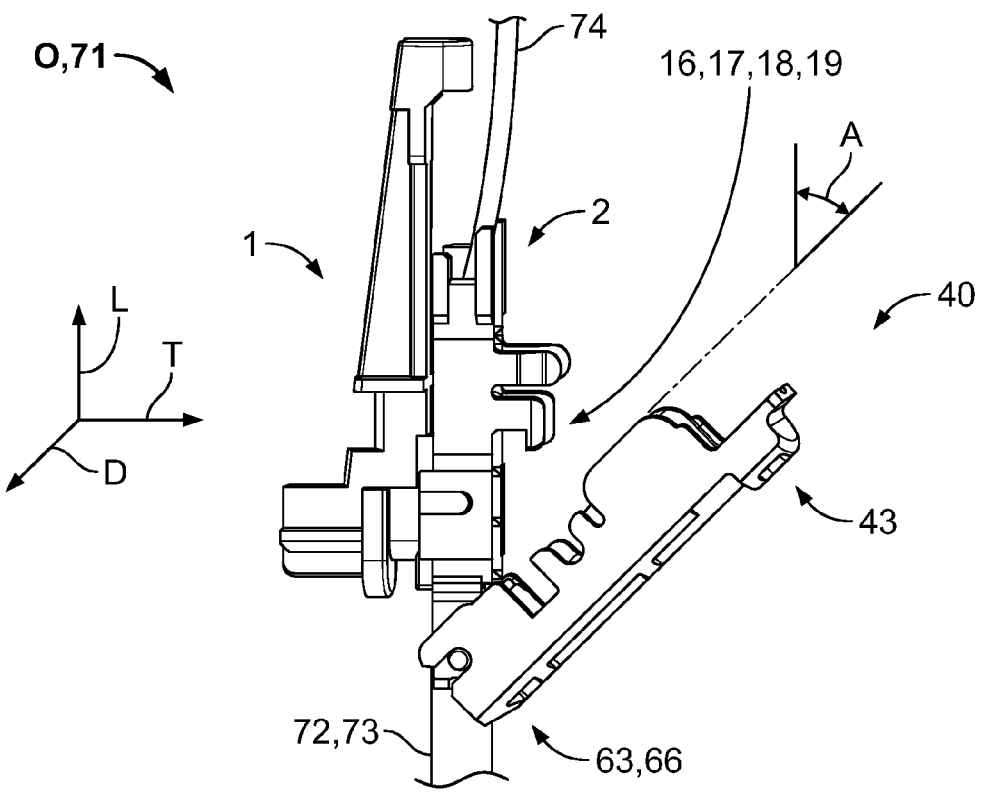
FIGS. 5 to 7 show an exemplary embodiment of the holding fixture with the affixing member and the clamping member joined in schematic perspective views.

FIG. 5 shows an embodiment of the holding fixture 71, in an opening position O. In the opening position O, the affixing member 1 and the clamping member 40 may be joined by means of the hinge members 26, 27, 41, 42 of the affixing member 1 and the clamping member 40. For instance, and as shown in FIG. 5, the bearing pins of the hinge members 26, 27 may be accommodated in the bearing recesses of the hinge members 41, 42. Due to the hinge-like manner of joining, the clamping member 40 can be secured against translational movements against the longitudinal direction L and its operating end 43 can be swivelled towards and away from the affixing member 1. In the opening position O, an opening angle A between the affixing member 1 and the clamping member 40 can be maximum and the hinge end 63 of the clamping member 40 may rest against the cable 72, which can be arranged in the holding channel 2 and extends in the longitudinal direction L. The more distinct the curvature of the cable indentation 66, the larger the opening angle A can be. The coordinate system with the directions L, D, T is aligned with respect to the affixing member 1. For the clamping member 40, the coordinate system has to be rotated about the opening angle A.

As can be seen in FIG. 5, the cable 72 enters the holding channel 2 with its sheath 73 still being around a conductor of the cable 72. When leaving the holding channel 2 in the longitudinal direction L, the sheath 73 may, however, be removed from the cable 72, such that only the conductor 74 extends from the holding channel 2 in the longitudinal direction L. The strain-relief tape of the cable 72, which is omitted in FIG. 5, may now be affixed to the retaining devices 16, 17, e.g. by winding it around the retaining devices 16, 17, in order to clamp the strain-relief tape into the retaining recesses 18, 19. When swivelling the clamping member 40 out of the opening position O towards the affixing member 1, the strain-relief tape may furthermore be clamped between the affixing member 1 and the clamping member 40.

Figure 6:
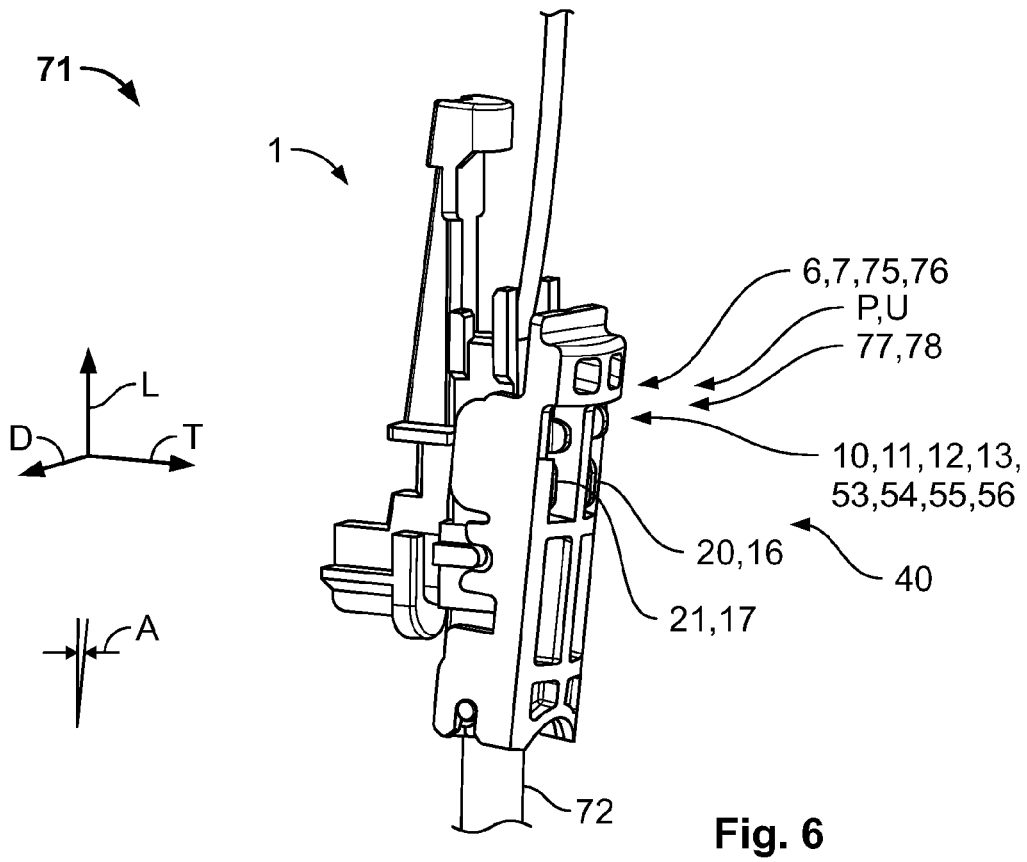

FIG. 6 shows the holding fixture 71 in a view, in which the clamping member 40 is swivelled from the opening position O towards the affixing member 1 and is arranged in a pre-holding position P. In the pre-holding position P, the clamping member 40 is swivelled towards the affixing member 1 until the latching elements 10, 11, 53, 54 of the affixing member 1 and the clamping member 40 are in physical contact. Yet, in the pre-holding position P, the latching devices 6, 7 of the affixing member 1 may still be in their undeflected positions U.

When moving the operating end 43 further towards the affixing member 1 against the transverse direction T, the latching elements 10, 11, 53, 54 may interact and push the latching devices 6, 7 out of the undeflected positions U towards each other. Thereby, the latching devices 6, 7 may elastically deform and act with a bias force onto the clamping member 40. Due to the bevelled surfaces 12, 13 of the latching devices 6, 7, which may each rest against the deflection elements 55, 56 of the clamping member 40, when the clamping member 40 is swivelled out of the pre-holding position P against the transverse direction T, the bias force can result in a movement towards the pre-holding position P of the clamping member 40.

Thus, the clamping member 40 may automatically be returned into the pre-holding position P, if it is incompletely swivelled from the pre-holding position P into the holding position. Hence, the latching devices 6, 7 may also be designated as return spring devices 75, 76. In an alternative embodiment, the return spring devices 75, 76 may be formed separately from the latching devices 6, 7 and may for instances be integral with the retaining devices 16, 17 or may be formed as separated elements of the affixing member 1 or of the clamping member 40.

In the pre-holding position P, the clamping member 40 at least sectionwise shields the latching devices 6, 7 and/or the retaining devices 16, 17 laterally, i.e. in or against the width direction D. When further swivelling the clamping member 40 towards the affixing member 1, the latching devices 6, 7 and/or the retaining devices 16, 17 can further protrude from the clamping member 40 in the transverse direction T. In particular, the bevelled surfaces 12, 13 of the latching devices 6, 7 and/or the retaining projections 20, 21 of the retaining devices 16, 17 can at least sectionwise or even completely be shielded laterally by the clamping member 40 in the pre-holding position P. At least the bevelled surfaces 12, 13 of the latching elements 10, 11 and/or at least the retaining projections 20, 21 of the retaining devices 16, 17 may be more easily visible in or against the width direction D, when the clamping member 40 is moved out of its pre-holding position P towards the affixing member 1 and in particular if the clamping member 40 is arranged in the holding position.

As the clamping member 40 is automatically returned from a position between the pre-holding position P and the holding position into the pre-holding position P, at least sections of the latching devices 6, 7 and/or the retaining devices 16, 17 may be used for indicating that the clamping member 40 is securely arranged in the holding position. Hence, the latching devices 6, 7 and/or the retaining devices 16, 17 may be designated as indicator elements 77, 78 for indicating that the clamping member 40 is arranged in the holding position. In an alternative embodiment, the indicator elements 77, 78 may be provided separately of the latching devices 6, 7 and/or of the retaining devices 16, 17. In any case, the indicator elements 77, 78 are preferably adapted to at least sectionwise be laterally shielded by the clamping member 40 in its pre-holding position P and in particular be shielded completely in the width direction D in the pre-holding position P. In the holding position, the indicator elements 77, 78 preferably further protrude from the clamping member 40 in the transverse direction T, such that they are clearly visible in the width direction D.

Furthermore, in order to better recognise the indicator elements 77, 78, the indicator elements may be formed with different surface properties than the clamping member 40, e.g. the indicator elements 77, 78 may have a different colour than the clamping member 40.

Figure 7:
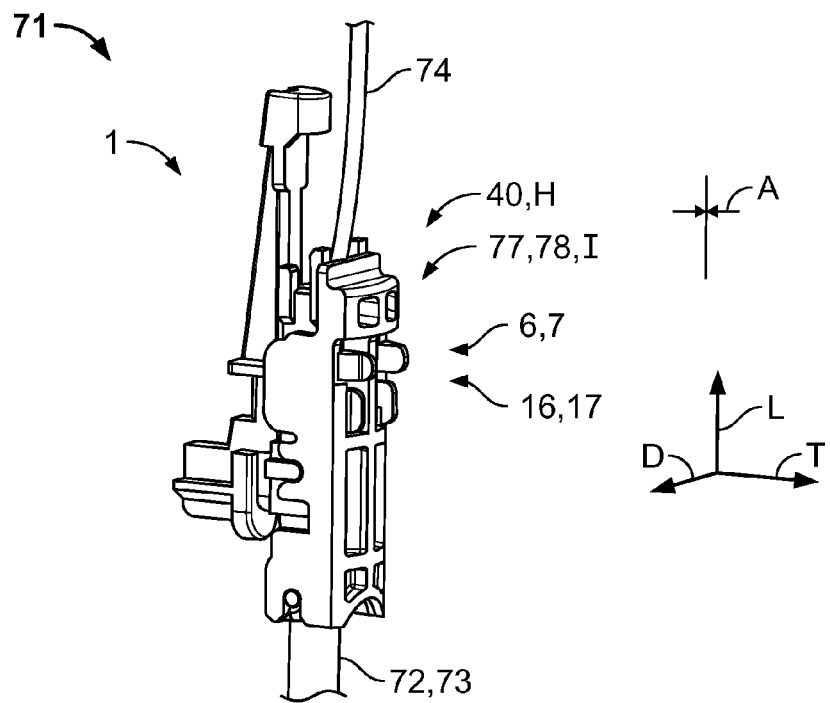

FIG. 7 shows the holding fixture 71 in a schematic perspective view, in which the clamping member 40 is arranged in its holding position H.

In its holding position H, the clamping member 40 is affixed by the latching devices 6, 7 of the affixing member 1. The opening angle A is minimal and may for instance be zero in the holding position H. The clamping legs 44, 45 may press against the side supports 3, 4, pressing the side supports 3, 4 towards the holding channel 2, i.e. towards each other and against the cable 72 and in particular against its sheath 73. Due to the gripping structure 30 of the holding surfaces 28, 29, the cable 72 is affixed inside the holding channel 2 and in particular secured against movements in or against the longitudinal direction L. Furthermore, the cable 72 may be secured against movements in or against the transverse direction T by the ground 5 of the holding channel 2 and by the front 46 of the clamping member 40. The clamping member 40 is preferably held by the holding surfaces 14, 15 of the latching devices 6, 7, which may abut against the latching elements 53, 54 of the clamping member 40 and in particular lay against the setbacks 67, 68 in the front 46.

The indicator elements 77, 78, for instance the latching devices 6, 7 and/or the retaining devices 16, 17, are in the holding position H of the clamping member 40 preferably arranged in their indication position I, in which they can easily be perceived. For instance, in their indication position I, the indicator elements 77, 78 may at least sectionwise protrude from the clamping member 40 in the transverse direction T, at least one of them indicating that the clamping member 40 is arranged in the holding position H.

Figure 8:
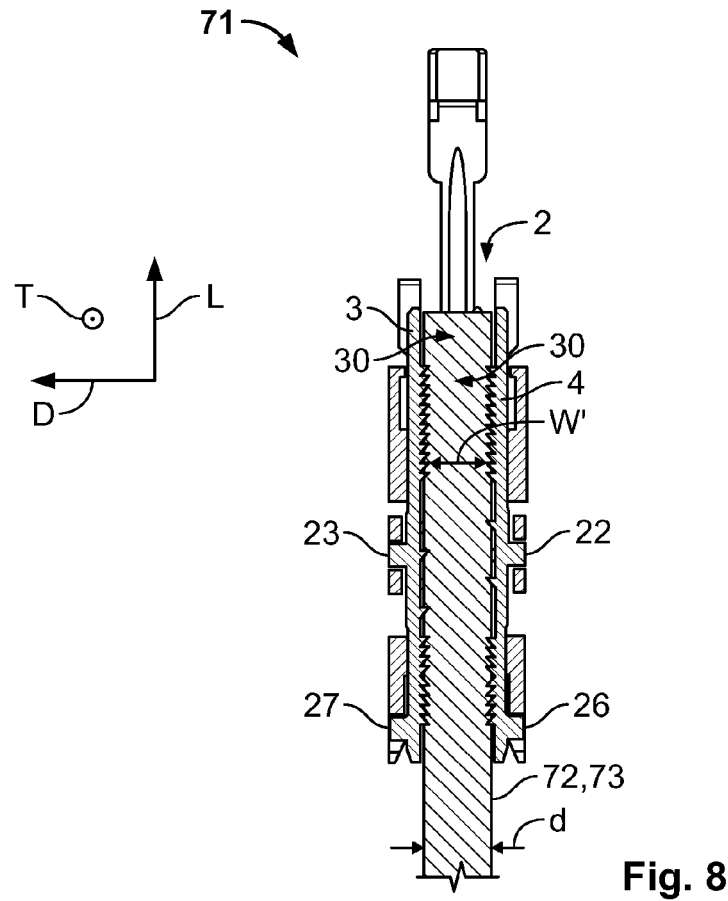
FIG. 8 shows the embodiment of the holding fixture of FIGS. 5 to 7 in a schematic cross-sectional view.

FIG. 8 is a cross-sectional view of the holding fixture 71 with the clamping member 40 being arranged in the holding position H. The longitudinal direction L and the width direction D are arranged in the plane of projection and the transverse direction T points out of the plane of projection in the view of FIG. 8.

Tips of the teeth of the gripping structure 30 penetrate the sheath 73 of the cable 72 in order to engage the sheath 73 in a form-fit manner. In order to be able to easily introduce the cable 72 into the holding channel 2 in the longitudinal direction L, a clear width W' between the opposing side supports 3, 4 including the gripping structures 30 may be at least a little larger than a diameter d of the cable 72 including its sheath 73. After introducing the cable 72 into the holding channel 2, the side supports 3, 4 are pressed against the sheath 73 by the clamping legs 44, 45 of the clamping member 40 in the holding position H. In order to secure the cable 72 against movements not only against but also in the longitudinal direction L, the gripping structure 30 may comprise teeth with fronts that extend parallel to the width direction D and point into the longitudinal direction L and other teeth with fronts that run parallel to the width direction D and against the longitudinal direction L.

In order not to deform the side supports 3, 4 in the area of the guiding elements 22, 23 due to resistance of the sheath 73, the gripping structure 30 may comprise less or no teeth in the area of the guiding elements 22, 23.

In the longitudinal direction L, before and/or after the guiding elements 22, 23, the gripping structure 30 may be shaped with a higher teeth density than in the area of the guiding elements 22, 23, and in particular in the area of the hinge members 26, 27 teeth may be arranged whose fronts face the longitudinal direction L.

Figure 9:
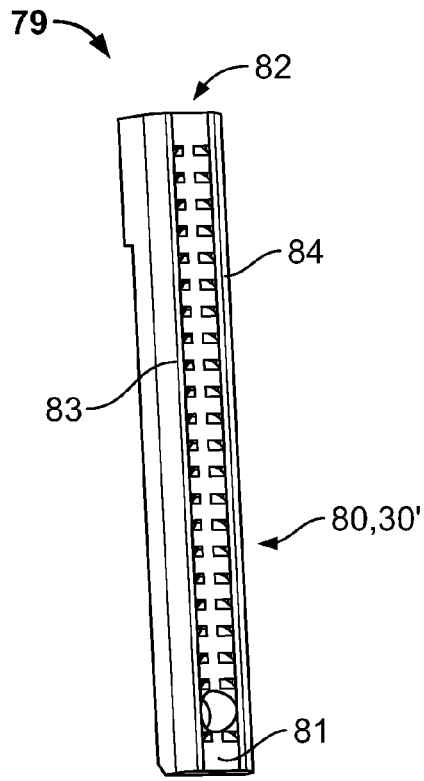
FIGS. 9 and 10 show an exemplary embodiment of an adapter rod of the holding fixture according to the invention in schematic perspective views.
Figure 10:
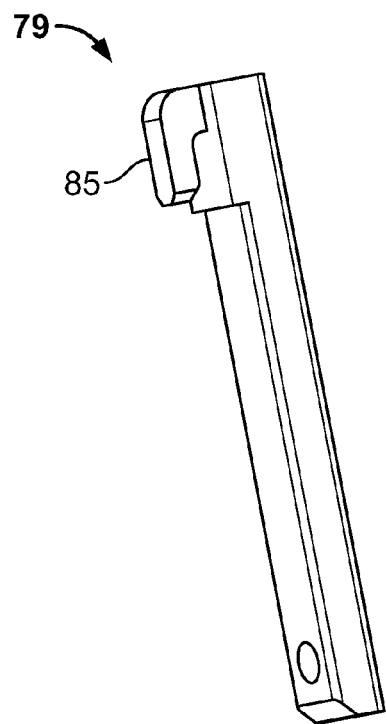

FIGS. 9 and 10 show an embodiment of an adapter rod 79 in two schematic perspective views.

Figure 11:
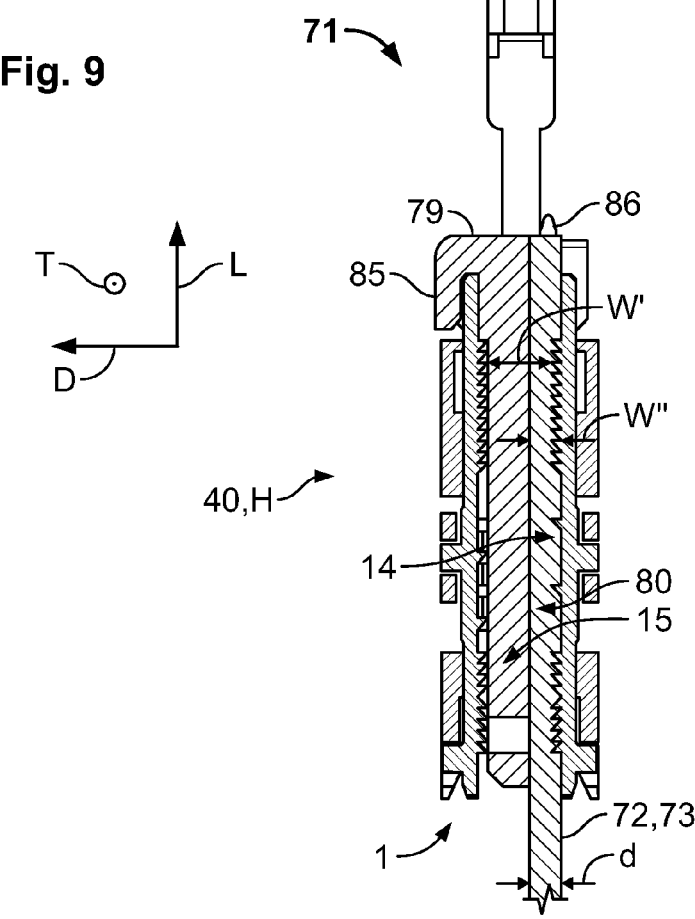
FIG. 11 shows the holding fixture according to the embodiment of FIGS. 5 to 8 together with the adapter rod of the embodiment of FIGS. 9 and 10 in a schematic cross-sectional view.

The adapter rod 79 may be shaped with a holding surface 80, which can comprise a gripping structure 30'. In the embodiment of FIGS. 9 to 11, the gripping structure 30' is formed by tips that protrude from the holding surfaces 80. The holding surface 80 can be arranged on a bottom 81 of a groove 82, which can extend on one side of the rod 79 over its complete length. The groove 82 may be flanked by holding cheeks 83, 84, which are arranged parallel and opposite to each other. A distance between the holding cheeks 83, 84 may be adapted to the diameter d of the cable 72 with the sheath 73. The distance between the holding cheeks 83, 84 is preferably dimensioned such that the cable 72 is at the same time in contact with the holding cheeks 83, 84 and with the gripping structure 30', when the cable 72 rests against the adapter rod 79.

On a side that is turned away from the holding surface 80, the adapter rod 79 may comprise a mounting device 85 for mounting the adapter rod 79 in the holding channel 2 of the affixing member 1. In FIG. 10, the mounting device is in an exemplary manner claw- or hook-shaped and arranged at one longitudinal end of the adapter rod 79, opening to the opposite longitudinal end of the adapter rod 79.

FIG. 11 shows the holding fixture 71 in a cross-sectional view, in which the longitudinal direction L and the width direction D extend parallel and the transverse T points out of the plane of projection.

The cable 72 of FIG. 11 has a diameter d, which is smaller than the clear width W' of the affixing member 1, even if the clamping member 40 is arranged in its holding position H. In order to be able to hold and affix such a cable 72 with the holding fixture 71, the adapter rod 79 can be arranged in the holding channel 2 next to the cable 74 such that the sheath 73 of the cable 72 rests against the holding surface 80 of the adapter rod 79 and one of the holding surfaces 14, 15 of the affixing member 1. A distance between the cable 72 and one of the holding surfaces 14, 15 is thereby bridged by the adapter rod 79.

For instance, the adapter rod 79 may be introduced into the holding channel 2 against the longitudinal direction L, until its mounting device 85 prevents a further movement of the adapter rod 79 relative to the affixing member 1. In this mounted state of the adapter rod 79, a clear width W" between the holding surface 80 of the adapter rod 79 and the opposite holding surface 14, 15 may be sufficient for easily introducing the cable 72 into the remaining free holding channel 2 in or transverse to the longitudinal direction L. After closing the holding fixture 71 by moving the clamping member 40 into the holding position H, the clear width W" is preferably reduced due to pressing the side supports 3, 4 towards each other and the cable 72 is pressed between the holding surface 80 of the rod 79 and one of the holding surfaces 14, 15 of the affixing member 1.

A strain-relief tape 86 extends from the sheath 73 in the longitudinal direction L and is then guided to at least one retaining device 16, 17 for affixing thereon.

Even though the holding fixture is principally described above with respect to holding at least one cable, in particular a fibre optic cable, the holding fixture is likewise for holding a tube, in which a cable is guided.

The invention claimed is:

1. A holding fixture for holding at least one cable, in particular a fibre optic cable, along a longitudinal direction of the cable, the holding fixture comprising an affixing member for holding the cable, the affixing member being shaped with two laterally opposing side supports, which define between them a holding channel for at least sectionwise receiving the cable, the holding channel extending in the longitudinal direction, and a clamping member, the clamping member being adapted to be mounted on the affixing member and, in a mounted state, to be moved from a pre-holding to a holding position, wherein the affixing member comprises at least one indicator element, which, in the pre-holding position, is at least sectionwise laterally shielded by the clamping member and, in the holding position, is arranged in an indication position for indicating that the clamping member is arranged in the holding position.

2. The holding fixture according to claim 1, wherein a return spring device, which, in a position of the clamping member between the pre-holding and the holding position, exerts a bias force onto the clamping member directed towards the pre-holding position.

3. The holding fixture according to claim 2, wherein the return spring device is provided with the indicator element.

4. The holding fixture according to claim 1, further comprising at least one latching device for securing the clamping member in the holding position.

5. The holding fixture according to claim 4, wherein the latching device is provided with the indicator element.

6. The holding fixture according to claim 1, further comprising a retaining device that is adapted to retain a strain-relief tape of the cable.

7. The holding fixture according to claim 6, wherein the retaining device is provided with the indicator element.

8. The holding fixture according to claim 1, wherein the clamping member has an essentially U-shaped cross-section with a clamping channel defined between opposing clamping legs, wherein a clear width between the clamping legs at least sectionwise increases towards free ends of the clamping legs.

9. The holding fixture according to claim 8, wherein the minimum clear width is smaller than a distance between pressing surfaces of the side supports, the pressing surfaces pointing away from the holding channel.

10. The holding fixture according to claim 1, wherein at least one area of a holding surface of at least one of the side supports is formed with a gripping structure, the holding surface facing the holding channel.

11. The holding fixture according to claim 1, wherein the clamping member and the affixing member are joined in a hinge-like manner.

12. The holding fixture according to claim 1, wherein the affixing member and the clamping member each comprise at least one guiding element for cooperatively guiding a movement of the clamping member into its holding position.

13. The holding fixture according to claim 1, further comprising an adapter rod that is adapted to be introduced into the holding channel.

14. The holding fixture according to claim 1, wherein the holding fixture is part of a kit, the kit comprising at least one mounting member for connecting the holding fixture to another holding fixture.

15. The holding fixture according to claim 1, wherein the holding fixture is a part of a gel sealing device for sealingly guiding an holding the cable.

* * * * *